United States Patent Office 3,764,354
Patented Oct. 9, 1973

3,764,354
FLUORIDE BOROSILICATE GLASS HAVING LOW REFRACTION, AN OPTICAL PATH INDEPENDENT OF TEMPERATURE, AND AN ELEVATED DISPERSION
Willi Ritze, Mainz, Mombach, and Franz Reitmayer, Drais, Germany, assignors to JENAer Glaswerk Schott & Gen., Mainz, Germany
No Drawing. Continuation of abandoned application Ser. No. 820,007, Apr. 28, 1969. This application July 19, 1972, Ser. No. 273,087
Claims priority, application Germany, May 4, 1968, P 17 71 312.1
Int. Cl. C03c *3/08, 3/10, 3/30*
U.S. Cl. 106—54        19 Claims

ABSTRACT OF THE DISCLOSURE

Fluoride borosilicate glass characterized by a low index of refraction, an optical path independent of temperature and an elevated dispersion consisting essentially of, in weight percent:

| | |
|---|---|
| $SiO_2$ | 14–63 |
| $B_2O_3$ | 6–20 |
| $Al_2O_3$ | 5–18 |
| Alkali oxide plus alkali fluoride | 8–20 |
| $Sb_2O_3$ | 1.5–32 |
| Plus additional fluorine, as fluorides, calculated as elemental fluorine | 1–12 |

This application is a continuation of Ser. No. 820,007, filed Apr. 28, 1969, now abandoned.

BACKGROUND

This invention relates to fluoride borosilicate glass having a low refractive index, an optical path substantially independent of temperature and an elevated dispersion.

It is known that wavefronts are deformed in glasses when the optical path varies as a result of temperature gradients occurring at different points in the glass.

Optical instruments forming part of the equipment of space vehicles, for example, are exposed to great temperature differences by alternate solar radiation followed by loss of radiant heat in space, and also by emitted and/or reflected infrared radiation from close planets. These temperature difference produce wave deformations in optical glasses, thereby diminishing the resolving power of the optical systems.

Even in aerial photography, the temperature gradients that occur at high altitudes can considerably detract from resolving power.

There is, therefore, a great need to provide optical systems and optical windows from glass compositions having optical paths that are independent of temperature.

In planoparallel aircraft and spacecraft windows, for example, the optical path variation resulting from the temperature variation is expressed by the following formula:

$$\Delta w = W_1 - W_2 = d \cdot G \cdot \Delta t = d \cdot \left(\alpha(n-1) + \frac{dn}{dt}\right) \cdot \Delta t$$

An undesirable wavefront deformation is produced when $\Delta W$ varies in magnitude as a result of temperature gradients occurring at different points in the window. The above formula shows that the optical path difference $\Delta W$ can be reduced by reducing the thickness $d$ of the glass element, the temperature difference $\Delta t$, or the magnitude of $$G = \alpha(n-1) + \frac{dn}{dt}$$

The magnitude of G depends only on the physical properties of the glass and is required to be as small as possible and ideally should be 0. The value of $dn/dt$ must therefore be negative. This would be made possible by the introduction of glass components:

(1) Which produce an optimal elevation of the coefficient of thermal expansion, (2a) Which affect the glass in such a manner that the temperature-dependence of the natural ultraviolet frequency $(d\lambda_o/dt)$ remains as low as possible, and/or (2b) Which bring about a shift of the natural ultraviolet frequencies $\lambda_o$ of the glass towards the short wavelengths.

However, the increase in the thermal expansion, which is necessary according to (1), makes it difficult to meet the requirement that G be equal to zero, as, due to the resultant increase in the term $\alpha(n-1)$, the temperature coefficient $dn/dt$ has to assume very high negative values. This conflict clearly shows the difficulties affecting the development of glasses having an optical path that is independent of temperature

THE INVENTION

It is a primary object of the present invention to provide glass compositions in which the disturbing effect of a temperature gradient on the image-making properties is prevented.

It is another object of the present invention to provide glasses having low refractive indices, elevated dispersions and optical paths substantially independent of temperature.

These and other objects of the invention are realized by glasses having the following composition in percent by weight and the following properties:

| | |
|---|---|
| $SiO_2$ | 15.8–57.6 |
| $B_2O_3$ | 7.2–17.8 |
| $Al_2O_3$ | 5.3–15.2 |
| $Li_2O$ | 0–0.3 |
| $Na_2O$ | 0–12.5 |
| $K_2O$ | 0–12.5 |
| $Sb_2O_3$ | 1.6–30.4 |
| KF | 0–16.6 |
| $AlF_3$ | 0.3–18.3 |
| $WO_3$ | 0–0.5 |
| $Nb_2O_5$ | 0–1.1 |
| $Al_2(SO_4)_3$ | 0–15.6 |
| $Cs_2O$ | 0–1.0 |
| PbO | 0–4.3 |
| $As_2O_3$ | 0.2–0.3 |
| $Rb_2O$ | 0–1.0 | and F in amount of 0–5.6 wt. percent, batch basis, of the balance of the batch, said glass having a negative $dn/dt$ value, an index of refraction $n_d$ of 1.4619–1.5334, and an Abbe valve $v_d$ of 44.7–68.4.

Fluoride can be added to the melt in the form of a fluoride, for example, as KF, $AlF_3$, a bifluoride, as for instance $KHF_2$ or in another form, as for example, a silico fluoride.

In glass compositions which have been prepared on a basis of $SiO_2$, the components fluorine, $B_2O_3$ and $K_2O$ produce a negative shift in the $dn/dt$ values without substantially increasing the thermal expansion.

The fluorine component also has the effect that the temperature independence of the ultraviolet natural frequency $d\lambda_o/dt$ is minimized. An increasing $B_2O_3$ content shifts the ultraviolet natural frequency $\lambda_o$ towards the short wave lengths, and $Sb_2O_3$ does not have any unfavorable influence on the ultraviolet natural frequency $\lambda_o$.

The following examples of compositions of the glasses according to the invention and their physical properties are given for the purpose of illustrating the present invention. The examples are not, however, to be construed in limitation thereof.

TABLE

| Example | 1 | 2 | 3 | 4 | 5 | 6 | 7 | 8 |
|---|---|---|---|---|---|---|---|---|
| $SiO_2$ | 48.9 | 49.8 | 44.5 | 41.5 | 37.3 | 38.1 | 36.5 | 37.0 |
| $B_2O_3$ | 14.9 | 17.2 | 17.8 | 15.2 | 15.3 | 17.7 | 13.2 | 9.6 |
| $Al_2O_3$ | 6.5 | 7.1 | 14.3 | 15.2 | 13.7 | 14.4 | 12.8 | 11.5 |
| $Li_2O$ | | | | | | | | |
| $Na_2O$ | 0.1 | 0.3 | 1.4 | 0.3 | 0.3 | 0.5 | 0.1 | 2.0 |
| $K_2O$ | 6.2 | 6.3 | 3.5 | 3.3 | 3.0 | 3.1 | 2.9 | 12.5 |
| $Sb_2O_3$ | 9.8 | 4.7 | 4.7 | 4.7 | 14.6 | 9.5 | 19.7 | 13.8 |
| KF | 12.5 | 13.4 | 12.6 | 16.6 | 13.7 | 14.6 | 12.9 | |
| $AlF_3$ | 0.8 | 0.9 | 0.9 | 2.9 | 1.8 | 1.8 | 1.6 | 13.3 |
| $WO_3$ | | | | | | | | |
| $Nb_2O_5$ | | | | | | | | |
| $Al_2(SO_4)_3$ | | | | | | | | |
| PbO | | | | | | | | |
| $As_2O_3$ | 0.3 | 0.3 | 0.3 | 0.3 | 0.3 | 0.3 | 0.3 | 0.3 |
| F[1] | 4.3 | 4.5 | 4.5 | 4.2 | 5.6 | 4.5 | 4.3 | 3.8 |
| $n_d$ | 1.4924 | 1.4822 | 1.4710 | 1.4619 | 1.4875 | 1.4718 | 1.4952 | 1.4799 |
| $v_d$ | 61.1 | 64.5 | 62.2 | 63.0 | 55.1 | 58.9 | 51.9 | 55.8 |
| $\alpha \cdot 10^{-7}$ per °C | | 95 | 90 | 108 | 100 | 104 | 96 | |
| $\Delta n/\Delta t$ abs.[2] $\cdot 10^6$ | | −3.3 | −4.3 | −4.8 | −4.5 | −4.6 | −4.7 | |
| $G_{abs.}=[(n-1)\alpha+\Delta n/\Delta t]10^6$ | +1.4 | +1.3 | −0.1 | +0.2 | +0.4 | +0.3 | +0.5 | |

| Example | 9 | 10 | 11 | 12 | 13 | 14 | 15 | 16 | 17 | 18 |
|---|---|---|---|---|---|---|---|---|---|---|
| $SiO_2$ | 36.2 | 34.0 | 34.8 | 29.2 | 38.3 | 35.4 | 34.6 | 25.1 | 15.8 | 57.6 |
| $B_2O_3$ | 7.2 | 8.7 | 16.9 | 11.0 | 11.0 | 10.2 | 10.3 | 17.4 | 15.1 | 14.0 |
| $Al_2O_3$ | 11.2 | 9.2 | 9.8 | 10.8 | 12.3 | 11.4 | 11.4 | 14.3 | 14.3 | 5.3 |
| $Li_2O$ | | | | | | | | 0.3 | 0.3 | |
| $Na_2O$ | 12.5 | | 3.5 | 0.1 | 0.1 | 0.1 | 0.1 | 0.5 | 0.5 | 0.1 |
| $K_2O$ | | 11.0 | 10.9 | 1.2 | 8.7 | 8.1 | 8.1 | 1.5 | 1.5 | 6.5 |
| $Sb_2O_3$ | 10.0 | 22.2 | 9.5 | 16.5 | 19.5 | 25.2 | 25.1 | 18.8 | 30.4 | 1.6 |
| KF | | 3.1 | | 13.9 | 7.3 | 6.9 | 6.6 | 15.8 | 15.8 | 12.4 |
| $AlF_3$ | 18.3 | 11.5 | 14.3 | 1.4 | 1.9 | 1.8 | 1.5 | 6.0 | 6.0 | 0.3 |
| $WO_3$ | | | | | 0.1 | 0.1 | 0.5 | | | |
| $Nb_2O_5$ | | | | | | | 1.1 | | | |
| $Al_2(SO_4)_3$ | | | | 15.6 | | | | | | |
| PbO | 4.3 | | | | 0.5 | 0.5 | 0.4 | | | |
| $Cs_2O$ | | | | | | | | | | 1.0 |
| $As_2O_3$ | 0.3 | 0.3 | 0.3 | 0.3 | 0.3 | 0.3 | 0.3 | 0.3 | 0.3 | 0.2 |
| F | | 1.2 | | 4.8 | 2.5 | 2.5 | 2.5 | 5.5 | 5.5 | 4.3 |
| $Rb_2O$ | | | | | | | | | | 1.0 |
| $n_d$ | 1.4978 | 1.5045 | 1.4957 | 1.5068 | 1.5111 | 1.5262 | 1.5334 | 1.4930 | 1.5142 | 1.4853 |
| $v_d$ | 53.4 | 49.8 | 56.0 | 50.9 | 50.6 | 47.0 | 45.4 | 51.5 | 44.7 | 68.4 |

[1] F in addition to that in KF and $AlF_3$, as fluoride; calculated as F; wt. percent based on balance of batch.
[2] Change in refraction value measured in vacuum at 20–40° C. and λ=546.1 nm.

The glass compositions of the invention can be prepared by the conventional methods well known to the artisan. An illustrative example of a procedure for preparing glasses according to the invention follows:

A batch of 750 kg. of silica, 460 kg. of boron trioxide, 145 kg. of aluminum hydroxide, 8 kg. of sodium carbonate, 140 kg. of potassium carbonate, 71 kg. of antimony trioxide, 201 kg. of potassium fluoride, 13.5 kg. of aluminum fluoride and 4.5 kg. of arsenic trioxide was mixed thoroughly in a standard commercial mixer. Following the mixing, the batch was placed in a ceramic pot furnace and completely fused at 1380° C. This took about 12 hours. The melt was then refined for 8 hours at 1400° C. Thereafter, the furnace temperature was reduced with constant stirring, until the glass had a viscosity of about 400 poises and was suitable for casting. The glass was then poured into a preheated iron mold and cooled down to room temperature. A glass was obtained which corresponds to Example 1 in the table. The cooling from the transformation point Tg of 360° C. down to room temperature was carried out at 1° C. per hour, or over a total period of 14 days.

What is claimed is:

1. Fluoride borosilicate glass characterized an optical path independent of temperature and an elevated dispersion consisting essentially of, in wt. percent, batch basis:

| | Wt. percent |
|---|---|
| $SiO_2$ | 15.8–57.6 |
| $B_2O_3$ | 7.2–17.8 |
| $Al_2O_3$ | 5.3–15.2 |
| $Li_2O$ | 0–0.3 |
| $Na_2O$ | 0–12.5 |
| $K_2O$ | 0–12.5 |
| $Sb_2O_3$ | 1.6–30.4 |
| KF | 0–16.6 |
| $AlF_3$ | 0.3–18.3 |
| $WO_3$ | 0–0.5 |
| $Nb_2O_5$ | 0–1.1 |
| $Al_2(SO_4)_3$ | 0–15.6 |
| $Cs_2O$ | 0–1.0 |
| PbO | 0–4.3 |
| $As_2O_3$ | 0.2–0.3 |
| $Rb_2O$ | 0–1.0 | and F in amount of 0–5.6 wt. percent, batch basis, of the balance of the batch, said glass having a negative $dn/dt$ value, an index of refraction $n_d$ of 1.4619–1.5334, and an Abbe value $v_d$ of 44.7–68.4.

2. Fluoride borosilicate glass according to claim 1 having the following composition:

| | Wt. percent |
|---|---|
| $SiO_2$ | 48.9 |
| $B_2O_3$ | 14.9 |
| $Al_2O_3$ | 6.5 |
| $Na_2O$ | 0.1 |
| $K_2O$ | 6.2 |
| $Sb_2O_3$ | 9.8 |
| KF | 12.5 |
| $AlF_3$ | 0.8 |
| $As_2O_3$ | 0.3 | and F in amount of 4.3 wt. percent, batch basis, of the balance of the batch.

3. Fluoride borosilicate glass according to claim 1 having the following composition:

| | Wt. percent |
|---|---|
| $SiO_2$ | 49.8 |
| $B_2O_3$ | 17.2 |
| $Al_2O_3$ | 7.1 |
| $Na_2O$ | 0.3 |
| $K_2O$ | 6.3 |
| $Sb_2O_3$ | 4.7 |
| KF | 13.4 |
| $AlF_3$ | 0.9 |
| $As_2O_3$ | 0.3 | and F in amount of 4.5 wt. percent, batch basis, of the balance of the batch.

4. Fluoride borosilicate glass according to claim 1 having the following composition:

| | Wt. percent |
|---|---|
| $SiO_2$ | 44.5 |
| $B_2O_3$ | 17.8 |
| $Al_2O_3$ | 14.3 |
| $Na_2O$ | 1.4 |
| $K_2O$ | 3.5 |
| $Sb_2O_3$ | 4.7 |
| KF | 12.6 |
| $AlF_3$ | 0.9 |
| $As_2O_3$ | 0.3 | and F in amount of 4.2 wt. percent, batch basis, of the balance of the batch.

5. Fluoride borosilicate glass according to claim 1 having the following composition:

| | Wt. percent |
|---|---|
| $SiO_2$ | 41.5 |
| $B_2O_3$ | 15.2 |
| $Al_2O_3$ | 15.2 |
| $Na_2O$ | 0.3 |
| $K_2O$ | 3.3 |
| $Sb_2O_3$ | 4.7 |
| KF | 16.6 |
| $AlF_3$ | 2.9 |
| $As_2O_3$ | 0.3 | and F in amount of 5.6 wt. percent, batch basis, of the balance of the batch.

6. Fluoride borosilicate glass according to claim 1 having the following composition:

| | Wt. percent |
|---|---|
| $SiO_2$ | 37.3 |
| $B_2O_3$ | 15.3 |
| $Al_2O_3$ | 13.7 |
| $Na_2O$ | 0.3 |
| $K_2O$ | 3.0 |
| $Sb_2O_3$ | 14.6 |
| KF | 13.7 |
| $AlF_3$ | 1.8 |
| $As_2O_3$ | 0.3 | and F in amount of 4.5 wt. percent, batch basis, of the balance of the batch.

7. Fluoride borosilicate glass according to claim 1 having the following composition:

| | Wt. percent |
|---|---|
| $SiO_2$ | 38.1 |
| $B_2O_3$ | 17.7 |
| $Al_2O_3$ | 14.4 |
| $Na_2O$ | 0.5 |
| $K_2O$ | 3.1 |
| $Sb_2O_3$ | 9.5 |
| KF | 14.6 |
| $AlF_3$ | 1.8 |
| $As_2O_3$ | 0.3 | and F in amount of 4.8 wt. percent, batch basis, of the balance of the batch.

8. Fluoride borosilicate glass according to claim 1 having the following composition:

| | Wt. percent |
|---|---|
| $SiO_2$ | 36.5 |
| $B_2O_3$ | 13.2 |
| $Al_2O_3$ | 12.8 |
| $Na_2O$ | 0.1 |
| $K_2O$ | 2.9 |
| $Sb_2O_3$ | 19.7 |
| KF | 12.9 |
| $AlF_3$ | 1.6 |
| $As_2O_3$ | 0.3 | and F in amount of 4.3 percent, batch basis, of the balance of the batch.

9. Fluoride borosilicate glass according to claim 1 having the following composition:

| | Wt. percent |
|---|---|
| $SiO_2$ | 37.0 |
| $B_2O_3$ | 9.6 |
| $Al_2O_3$ | 11.5 |
| $Na_2O$ | 2.0 |
| $K_2O$ | 12.5 |
| $Sb_2O_3$ | 13.8 |
| $AlF_3$ | 13.3 |
| $As_2O_3$ | 0.3 | and F. in amount of 3.8 wt. percent, batch basis, of the balance of the batch.

10. Fluoride borosilicate glass according to claim 1 having the following composition:

| | Wt. percent |
|---|---|
| $SiO_2$ | 36.2 |
| $B_2O_3$ | 7.2 |
| $Al_2O_3$ | 11.2 |
| $Na_2O$ | 12.5 |
| $Sb_2O_3$ | 10.0 |
| $AlF_3$ | 18.3 |
| PbO | 4.3 |
| $As_2O_3$ | 0.3 |

11. Fluoride borosilicate glass according to claim 1 having the following composition:

| | Wt. percent |
|---|---|
| $SiO_2$ | 34.0 |
| $B_2O_3$ | 8.7 |
| $Al_2O_3$ | 9.2 |
| $K_2O$ | 11.0 |
| $Sb_2O_3$ | 22.2 |
| KF | 3.1 |
| $AlF_3$ | 11.5 |
| $As_2O_3$ | 0.3 | and F in amount of 1.2 wt. percent, batch basis, of the balance of the batch.

12. Fluoride borosilicate glass according to claim 1 having the following composition:

| | Wt. percent |
|---|---|
| $SiO_2$ | 34.8 |
| $B_2O_3$ | 16.9 |
| $Al_2O_3$ | 9.8 |
| $Na_2O$ | 3.5 |
| $K_2O$ | 10.9 |
| $Sb_2O_3$ | 9.5 |
| $AlF_3$ | 14.3 |
| $As_2O_3$ | 0.3 |

13. Fluoride borosilicate glass according to claim 1 having the following composition:

| | Wt. percent |
|---|---|
| $SiO_2$ | 29.2 |
| $B_2O_3$ | 11.0 |
| $Al_2O_3$ | 10.8 |
| $Na_2O$ | 0.1 |
| $K_2O$ | 1.2 |
| $Sb_2O_3$ | 16.5 |
| KF | 13.9 |
| $AlF_3$ | 1.4 |
| $Al_2(SO_4)_3$ | 15.6 |
| $As_2O_3$ | 0.3 | and F in amount of 4.8 wt. percent, batch basis, of the balance of the batch.

14. Fluoride borosilicate glass according to claim 1 having the following composition:

| | Wt. percent |
|---|---|
| $SiO_2$ | 38.3 |
| $B_2O_3$ | 11.0 |
| $Al_2O_3$ | 12.3 |
| $Na_2O$ | 0.1 |
| $K_2O$ | 8.7 |
| $Sb_2O_3$ | 19.5 |
| KF | 7.3 |
| $AlF_3$ | 1.9 |
| $WO_3$ | 0.1 |
| PbO | 0.5 |
| $As_2O_3$ | 0.3 | and F in amount of 2.5 wt. percent, batch basis, of the balance of the batch.

15. Fluoride borosilicate glass according to claim 1 having the following composition:

| | Wt. percent |
|---|---|
| $SiO_2$ | 35.4 |
| $B_2O_3$ | 10.2 |
| $Al_2O_3$ | 11.4 |
| $Na_2O$ | 0.1 |
| $K_2O$ | 8.1 |
| $Sb_2O_3$ | 25.2 |
| KF | 6.9 |
| $AlF_3$ | 1.8 |
| $WO_3$ | 0.1 |
| PbO | 0.5 |
| $As_2O_3$ | 0.3 | and F in amount of 2.5 wt. percent, batch basis, of the balance of the batch.

16. Fluoride borosilicate glass according to claim 1 having the following composition:

| | Wt. percent |
|---|---|
| $SiO_2$ | 34.6 |
| $B_2O_3$ | 10.3 |
| $Al_2O_3$ | 11.4 |
| $Na_2O$ | 0.1 |
| $K_2O$ | 8.1 |
| $Sb_2O_3$ | 25.1 |
| KF | 6.6 |
| $AlF_3$ | 1.5 |
| $WO_3$ | 0.5 |
| $Nb_2O_5$ | 1.1 |
| PbO | 0.4 |
| $As_2O_3$ | 0.3 | and F in amount of 2.5 wt. percent, batch basis, of the balance of the batch.

17. Fluoride borosilicate glass according to claim 1 having the following composition:

| | Wt. percent |
|---|---|
| $SiO_2$ | 25.1 |
| $B_2O_3$ | 17.4 |
| $Al_2O_3$ | 14.3 |
| $Li_2O$ | 0.3 |
| $Na_2O$ | 0.5 |
| $K_2O$ | 1.5 |
| $Sb_2O_3$ | 18.8 |
| KF | 15.8 |
| $AlF_3$ | 6.0 |
| $As_2O_3$ | 0.3 | and F in amount of 5.5 wt. percent, batch basis, of the balance of the batch.

18. Fluoride borosilicate glass according to claim 1 having the following composition:

| | Wt. percent |
|---|---|
| $SiO_2$ | 15.8 |
| $B_2O_3$ | 15.1 |
| $Al_2O_3$ | 14.3 |
| $Li_2O$ | 0.3 |
| $Na_2O$ | 0.5 |
| $K_2O$ | 1.5 |
| $Sb_2O_3$ | 30.4 |
| KF | 15.8 |
| $AlF_3$ | 6.0 |
| $As_2O_3$ | 3.0 | and F in amount of 5.5 wt. percent, batch basis, of the balance of the batch.

19. Fluoride borosilicate glass according to claim 1 having the following composition:

| | Wt. percent |
|---|---|
| $SiO_2$ | 57.6 |
| $B_2O_3$ | 14.0 |
| $Al_2O_3$ | 5.3 |
| $Na_2O$ | 0.1 |
| $K_2O$ | 6.5 |
| $Sb_2O_3$ | 1.6 |
| KF | 12.4 |
| $AlF_3$ | 0.3 |
| $Cs_2O$ | 1.0 |
| $As_2O_3$ | 0.2 |
| $Rb_2O$ | 1.0 | and F in amount of 4.3 wt. percent, batch basis, of the balance of the batch.

References Cited
UNITED STATES PATENTS

| 3,020,165 | 2/1962 | Davis | 106—54 |
| 3,151,982 | 10/1964 | Corrsin | 106—54 |

WINSTON A. DOULAS, Primary Examiner

M. L. BELL, Assistant Examiner

U.S. Cl. X.R.

106—53

UNITED STATES PATENT OFFICE
CERTIFICATE OF CORRECTION

Patent No. 3,764,354　　　　　　　　Dated October 9, 1973

Inventor(s) Willi Ritze and Franz Reitmayer

It is certified that error appears in the above-identified patent and that said Letters Patent are hereby corrected as shown below:

Col. 3 and 4, the Table, Example 2, for $AlF_3$ "0 9" should be --0.9--.

2. Col. 3, line 72, change "Example 1" to --Example 2--.

3. Col. 4, line 2, after "characterized" insert --by--.

Signed and sealed this 14th day of January 1975.

(SEAL)
Attest:

McCOY M. GIBSON JR.　　　　　　　C. MARSHALL DANN
Attesting Officer　　　　　　　　Commissioner of Patents